(12) United States Patent
Kawasaki

(10) Patent No.: US 8,254,217 B2
(45) Date of Patent: Aug. 28, 2012

(54) SYSTEM AND METHOD FOR JUDGING PRESENCE/ABSENCE OF LOADING SPACES

(75) Inventor: Toshimitsu Kawasaki, Tokyo (JP)

(73) Assignee: NECEmbeddedProducts, Ltd., Tokyo (JP)

( * ) Notice: Subject to any disclaimer, the term of this patent is extended or adjusted under 35 U.S.C. 154(b) by 656 days.

(21) Appl. No.: 12/403,606

(22) Filed: Mar. 13, 2009

(65) Prior Publication Data
US 2009/0238055 A1    Sep. 24, 2009

(30) Foreign Application Priority Data

Mar. 21, 2008    (JP) .................................. 2008-73503

(51) Int. Cl.
*G11B 17/22*    (2006.01)
(52) U.S. Cl. .................. 369/30.34; 369/30.38; 369/30.4
(58) Field of Classification Search ............... 369/30.34, 369/30.38, 30.46, 34, 36, 38, 192, 178; 360/92.1, 360/69, 98.06, 98.04, 96.5; 206/387.12
See application file for complete search history.

(56) References Cited

U.S. PATENT DOCUMENTS

| | | | |
|---|---|---|---|
| 5,011,015 A | 4/1991 | Ziegler et al. | |
| 5,793,714 A * | 8/1998 | Inoue et al. | 369/30.34 |
| 6,115,331 A * | 9/2000 | Inoue et al. | 369/30.34 |
| 7,477,478 B2 * | 1/2009 | Nave et al. | 360/92.1 |
| 7,505,224 B2 * | 3/2009 | Chamorro et al. | 360/92.1 |
| 2003/0063411 A1 | 4/2003 | Ostwald | |
| 2007/0211366 A1 | 9/2007 | Chamorro et al. | |
| 2007/0230036 A1 | 10/2007 | Nave et al. | |

FOREIGN PATENT DOCUMENTS

JP    2005209278 A    8/2005

OTHER PUBLICATIONS

European Search Report for EP 09 15 4989 completed May 29, 2009.

* cited by examiner

*Primary Examiner* — Ali Neyzari

(57) ABSTRACT

Disclosed herewith is a library apparatus having plural loading cells, each of which can load at least two articles and using a pushing device that pushes the articles into the loading cell from its opening. And if the moving distance of any of the articles, which is pushed into the loading cell, is smaller than a first moving distance, the library apparatus judges that the loading cell has no loading space.

5 Claims, 6 Drawing Sheets

310 BIASING MEMBER

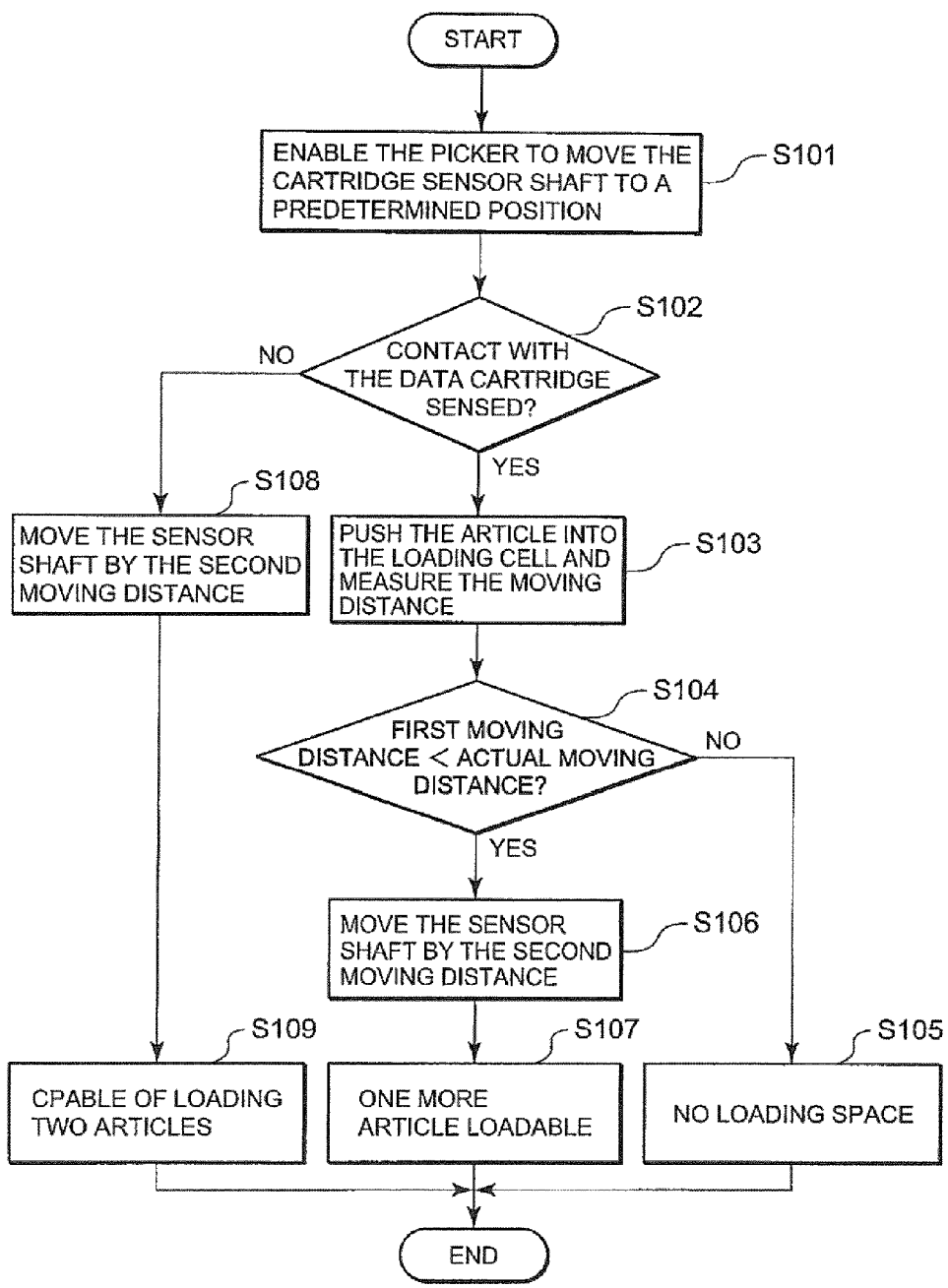

SYSTEM AND METHOD FOR JUDGING PRESENCE/ABSENCE OF LOADING SPACES

INCORPORATION BY REFERENCE

This application is based upon and claims the benefit of priority from Japanese patent application No. 2008-073503, filed on Mar. 21, 2008, the disclosure of which is incorporated herein in its entirety by reference.

FIELD OF THE INVENTION

The present invention relates to a system and a method for judging presence/absence of loading spaces for data cartridges in a library apparatus capable of loading a plurality of such data cartridges as magnetic tapes, magnetic disks, optical disks, or optical magnetic disks.

BACKGROUND OF THE INVENTION

As disclosed in the patent document Japanese unexamined patent application publication No. 2005-209278, there have been some well-known library apparatuses (referred to as data storage systems, etc. in some cases) that include a plurality of cells for loading data cartridges respectively. FIG. 5 shows an external perspective view of such a conventional library apparatus.

As shown in FIG. 5, the conventional library apparatus includes two magazines 1200 provided with a plurality of cells 1300 for loading data cartridges 1100 disposed horizontally one upon another respectively; two drive units 1600 for reading/writing data on the recording medium provided in each of the data cartridges 1100; and an accessor 1400 for transferring those data cartridges 1100. The two magazines 1200 are disposed so that the openings of their cells 1300 come to face each other. The accessor 1400 includes a swivel that rotates a picker 1500 that loads/unloads the data cartridges 1100.

The conventional library apparatus, which is configured as described above, is thus capable of loading many data cartridges in its limited space. In this case, however, each cell 1300 can load just one data cartridge 1100. And naturally, the library apparatus is required to manage presence/absence of loading spaces in those cells, as well as the total number of loaded/unloaded cells.

If each cell can load just one data cartridge as described above, a photosensor (not shown) provided for the picker is usually used to check each cell for empty. Concretely, the picker moves to the front of each cell sequentially and emits a light into the cell from its photosensor to judge that the cell is loaded if receiving a predetermined reflection in response of the emitted light. If not, the picker judges that the cell is not loaded. This detection uses a mechanism that a predetermined reflected light can always be detected from the data cartridge if a data cartridge is loaded in the cell. And when a loaded cell is detected, the picker judges that the cell has no loading space and when an empty cell is detected, the picker judges that the cell has a loading space. Then, the picker totals the number of loaded cells and the total number of empty cells.

If each cell can load only one cell, it is just required to detect whether or not each cell is loaded, thereby it is easy to total the number of empty cells. In this case, therefore, another method is available; for example, it is possible to read the bar-code label stuck on each data cartridge to judge whether or not there is any empty cells and total the number of empty cells according to the result.

On the other hand, in recent years, library apparatuses that have employed another cell structure referred to as the deep-cell system have appeared on the market. FIG. 1 shows a top view of a layout of such a library apparatus that has employed the deep-cell system. FIG. 2 shows an external perspective view of a magazine that has employed the deep-cell system. As shown in FIG. 2, the deep-cell system is characterized in that each cell can load a plurality of data cartridges. In case of the layout shown in FIG. 1, the accessor that does not require the swivel described above comes to further reduce the installation place of the library apparatus.

SUMMARY OF THE INVENTION

However, if a cartridge detector such as a photosensor is provided for the library apparatus 1 that has employed the deep-cell system as described above just like the conventional library apparatus, while the cartridge positioned in the front space of the cell (nearer to the cell opening) can be detected, another cartridge disposed in the back space of the cell cannot be detected. This has been a problem. This is because the light emitted from the photosensor is blocked by the cartridge disposed in the front space, thereby the light cannot reach the cartridge disposed in the back space of the cell (farther from the opening). This is why the presence/absence of the cartridge disposed in the back space cannot be judged.

In order to detect the presence/absence of the cartridge disposed in the back space, there are some conceivable methods; for example, the cartridge disposed in the front space is retracted once into another empty cell, then the cartridge disposed in the back space is moved forward so as to be detected. In this case, however, there will arise another problem: it takes much time to detect the cartridges loaded in all the deep cells, to judge whether or not there are any empty spaces in the library apparatus, and to count the number of loaded cells.

Under such circumstances, it is an object of the present invention to provide a system and a method for judging whether or not a library apparatus has any empty spaces for loading cartridges simply and easily. The present invention can also apply even to a library apparatus that loads a plurality of cartridges in a cell in the depth direction from each cell's opening.

The library apparatus of the present invention comprise a loading cell capable of loading at least two articles, the articles being loaded/unloaded from an opening of the loading cell; a biasing member that gives a biasing force to articles in a unloading direction; a locking device that locks the articles in the loading cell in resisting the biasing force; a pushing device that pushes the articles into the loading cell from the opening; a controller that acquires a moving distance of the articles pushed by the pushing device; and judges that the loading cell does not have any loading space when the moving distance of the article is smaller than a first moving distance.

The loading space judging method of the present invention comprise the step of pushing the articles in the opening of the loading cell; the step of acquiring that acquires a moving distance of the articles; and the step of judging that the loading cell has no loading space if the moving distance of the article is smaller than the first moving distance.

BRIEF DESCRIPTION OF THE DRAWINGS

FIG. 6 is a flowchart of the operations of the library apparatus in this embodiment of the present invention.

DETAILED DESCRIPTION OF THE PREFERRED EMBODIMENTS

Hereunder, there will be described the preferred embodiment of the present invention with reference to the accompanying drawings.

FIG. 1A is a top view of a layout of a library apparatus in an embodiment of the present invention. FIG. 1B is a front view of a magazine and data cartridges.

Figure 1:
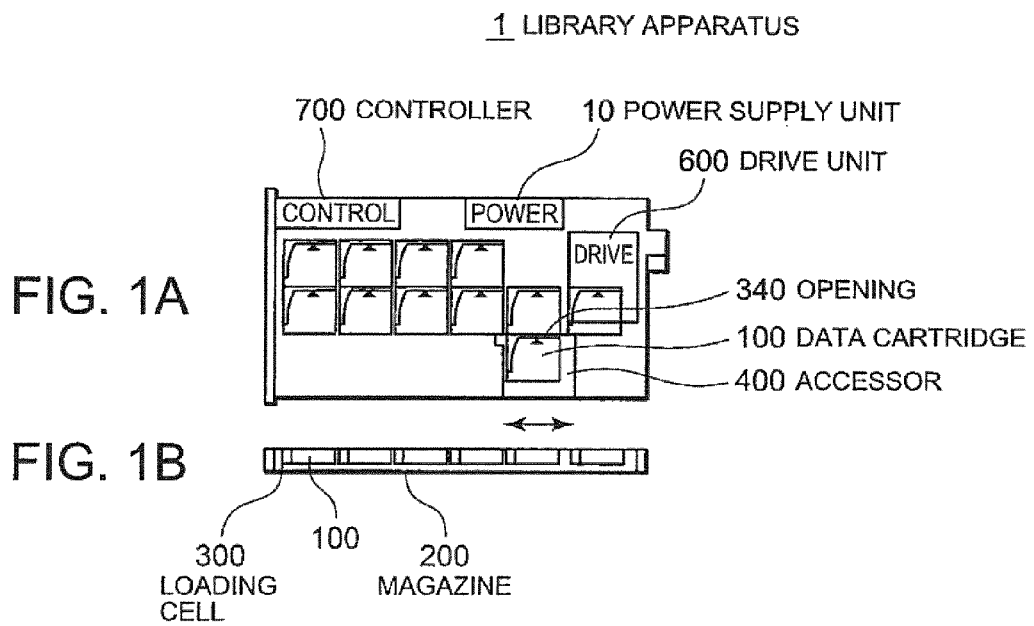
FIG. 1A is a top view of a library apparatus in this embodiment of the present invention.
FIG. 1B is a front top view of the library apparatus in this embodiment of the present invention.

The library apparatus 1 that employs the deep-cell system shown in FIG. 1 is an example of the loading space judging system in this embodiment. The library apparatus 1 that receives a power from a power supply unit 10 selects a proper cartridge from among a plurality of loaded data cartridges 100 according to a data read/write instruction, then transfers the selected cartridge to a read/write drive unit 600 with use of an accessor 400. A controller 700 of the library apparatus 1 controls the movements of the accessor 400 and a picker 500 shown in FIG. 3 to acquire their moving distances and judges whether or not the cell 300 has any loading space. FIG. 1B shows a front view of an opening 340 of the cell 300 from which the data cartridge 100 is loaded/unloaded. The portion denoted as 100 in FIG. 1B includes both the data cartridge 100 (first data cartridge) loaded closer to the opening 340 of the cell 300 and the opening 340 itself of the cell 300. As shown in FIG. 1A, there is also another data cartridge 100 (second data cartridge) disposed behind the first data cartridge 100.

Figure 2:
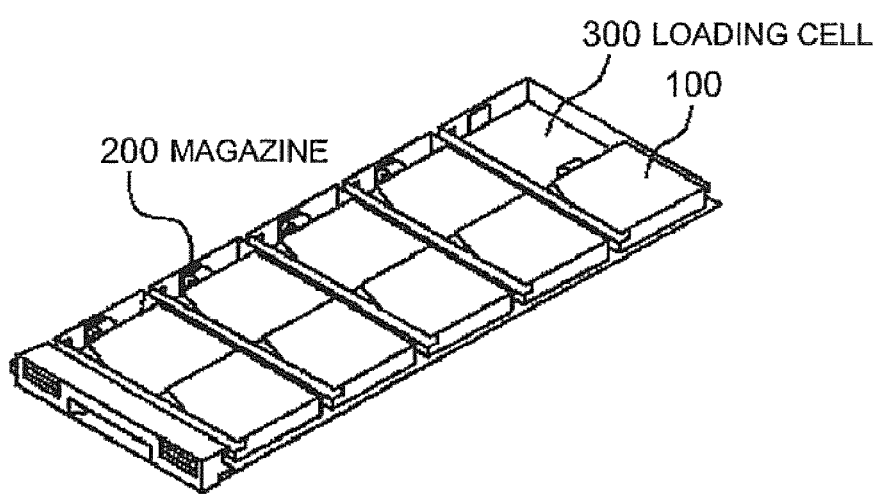
FIG. 2 is a perspective view of a magazine used in the library apparatus in this embodiment of the present invention.

As shown in FIG. 2, the magazine 200 consists of a plurality of cells capable of loading two data cartridges 100 respectively. In case of such a cell that loads two data cartridges 100 as described above, when one of the data cartridges 100 disposed farther from the opening 340 is to be taken out, the first data cartridge 100 disposed nearer to the opening 340 must be retracted once to another cell. Consequently, the magazine 200 is required to have a retracting space for at least one data cartridge. The magazine 200 shown in FIG. 2 includes five cells 300, thereby it can load 10 data cartridges 100 in total. However, because the magazine 200 is required to have a retracting space for at least one data cartridge, the magazine 200 shown in FIG. 2 can load only 9 data cartridges 100 actually. In the example shown in FIG. 2, each cell 300 loads two data cartridges 100; one in the front space (nearer to the opening 340) and the other in the back space (farther from the opening 340). However, the present invention can also apply to any library apparatuses that can load three or more data cartridges. Furthermore, the library apparatus in this embodiment may be replaced with any loading apparatus consisting of cells for loading articles as described above.

Figure 3:
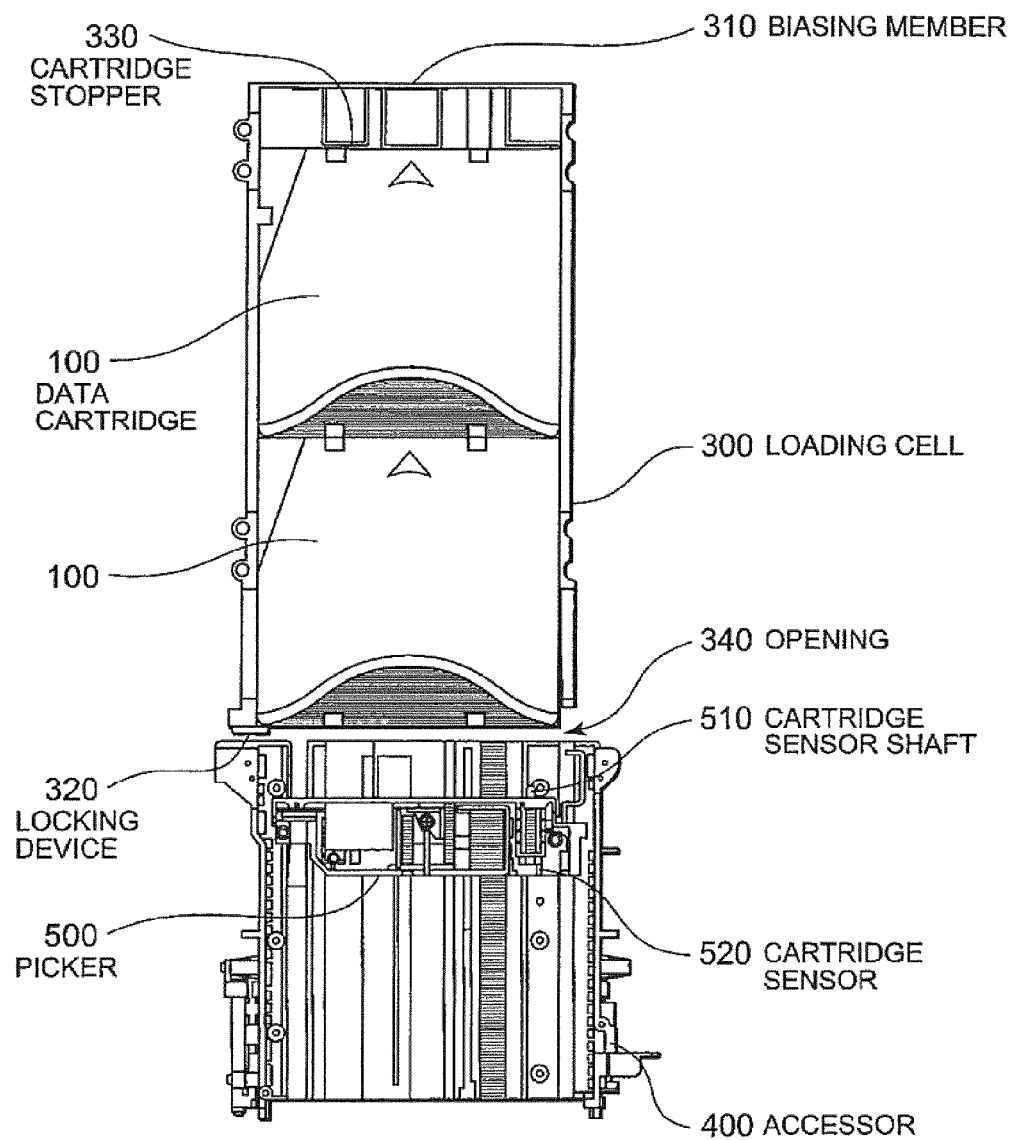
FIG. 3 is a top view for describing a relationship between a cell and a picker.

Next, there will be described in detail a structure of the data cartridge 100 to be loaded in the library apparatus in this embodiment, as well as a method for measuring how much each data cartridge is pushed into the cell so as to judge whether or not each cell has any loading space. FIG. 3 is a top view for describing a relationship between a data cartridge 100 loaded in one cell 300 in a magazine and a picker 500 of the magazine. In FIG. 3, two data cartridges 100 are pushed into the cell 300 sequentially from the opening 340, then they are biased toward the opening 340 by a biasing member 310 and held in the cell 300 by a locking device provided at the left side of the opening 340. The picker 500 is provided to load/unload those data cartridges 100 through this opening 340. The locking device 320 is set/reset as needed when each of those data cartridges 100 are to be loaded/unloaded.

The picker 500 can reset the locking device. When this resetting function is turned on, the biasing member 310 pushes out the selected data cartridge 100 from the cell through the opening 340, then the picker 500 moves farther from the opening 340 to pull the data cartridge 100 off the cell 300.

A cartridge stopper 330 is provided in the inner space of each cell 300. This stopper 330 stops the data cartridge 100 at a preset position from where the data cartridge never be moved farther. The picker 500 is also provided with a cartridge sensor shaft 510 and a cartridge sensor 520. The cartridge sensor shaft 510 pushes the data cartridge 100 into the cell farther from the opening 340 in accordance with the movement of the picker 500.

The cartridge sensor shaft 510, upon pushing a data cartridge 100 in, is pushed back as a reaction. The cartridge sensor 520, when the cartridge sensor shaft 510 is pushed back in such a way, that is, when the cartridge sensor shaft 510 comes in contact with the data cartridge 100, senses the contact. As a result, the library apparatus comes to judge that at least one data cartridge 100 is loaded in the cell 300. The cartridge sensor shaft 510 is structured to prevent the data cartridges 100 from moving beyond a preset limit position toward the cartridge sensor 520 of which sensing is disabled beyond the position. Furthermore, when the cartridge sensor shaft 510 pushes a data cartridge 100 into the back space of the cell 300 in accordance with the movement of the picker 500, the controller 700 acquires the moving distance of the data cartridge 100 up to the preset limit position as a length from the position where the cartridge sensor shaft 510 comes in contact with the data cartridge 100.

There is a photosensor function built in the cartridge sensor 520 as an example of the method for detecting that the cartridge sensor shaft 510 is pushed back. The function detects that a light is blocked by the pushed-back shaft. The moving distance of the picker 500 can be acquired, for example, by the controller 700, which uses pulses output from an encoder sensor for controlling the position of the picker.

Next, there will be described a relationship between the moving distance of a pushed-in data cartridge 100 and how to judge presence/absence of a loading space with reference to FIGS. 4 and 6. FIG. 4 shows a top view for describing a relationship between a position of the cartridge sensor shaft 510 provided for the picker 500 and a result of judgment for presence/absence of a cartridge loading space. FIG. 6 shows a flowchart of the processings.

Figure 4A:
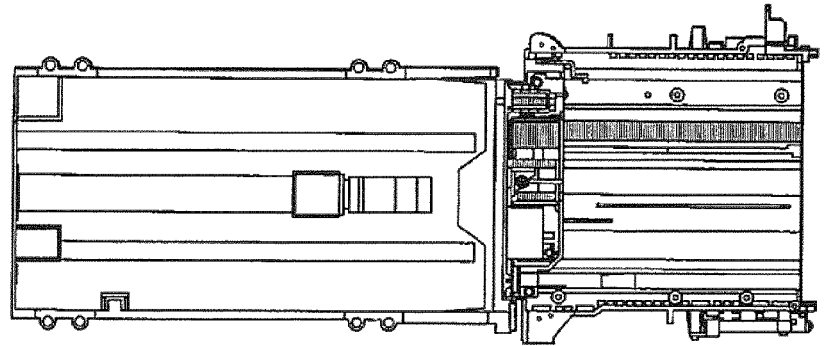
FIG. 4A is a top view for describing how to judge presence/absence of a cartridge loading space.

FIG. 4A shows a state in which the cartridge sensor shaft 510 is in contact with a data cartridge 100 when the cartridge sensor shaft 510 is pushed into the cell 300 from the opening 340 in accordance with the movement of the picker 500 (S10).

At this time, as described above, the cartridge sensor 520 senses that the cartridge sensor shaft 510 is in contact with the data cartridge 100 (S102—YES). And the position where the cartridge sensor shaft 510 comes in contact with the data cartridge 100 is used as a reference position for measuring the moving distance of the data cartridge 100. The moving distance of the data cartridge 100 from this reference position is judged as the moving distance of the data cartridge 100 at this time. At this time, the controller 700 can judge that at least one data cartridge is loaded in the cell 300.

Figure 4B:
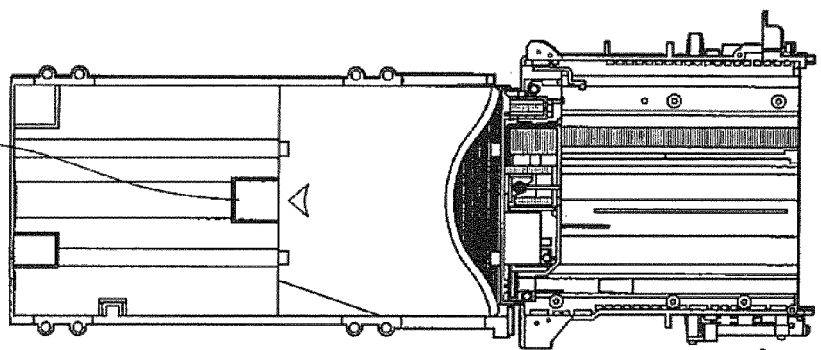
FIG. 4B is another top view for describing how to judge presence/absence of a cartridge loading space.

FIG. 4B shows a state in which the data cartridge 100 disposed in the back space of the cell 300 is blocked by the cartridge stopper 330 when the cartridge sensor shaft 510 is pushed further into the cell 300 (S103). The biasing force at this time can be set properly by taking consideration to the biasing force of the biasing member and the strength of each member of the apparatus in this embodiment. In this embodiment, when each cell 300 loads two data cartridges 100, the moving distance from the reference position to this blocked position is defined beforehand as a first moving distance; the first moving distance is defined as 5 mm in this embodiment. The first moving distance may be changed properly, however, by taking consideration to the apparatus error that might occur. In the case shown in FIG. 4B, the controller 700 acquires such a moving distance to a position away from the reference position (of 128 mm) by 132.5 mm in FIG. 4A; the cartridge sensor shaft 510 cannot move forward any longer from this position. The moving distance in this case is 4.5 mm. Consequently, because 4.5 mm<first preset moving distance (5 mm) is satisfied here (S104—NO), the controller 700 judges that two data cartridges 100 are already loaded in the cell 300 and the cell 300 has no loading space (S105).

Figure 4C:
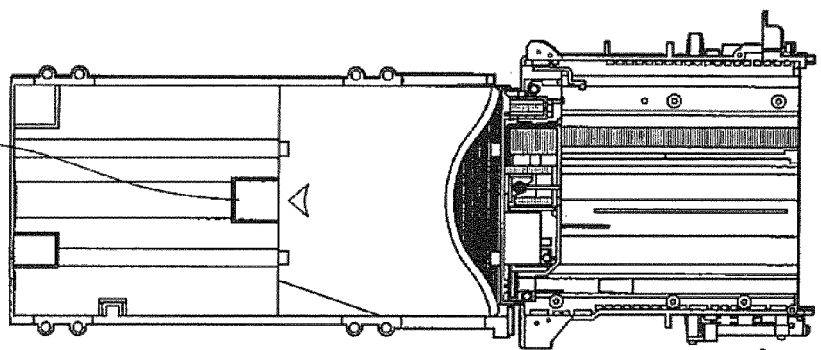
FIG. 4C is still another top view for describing how to judge presence/absence of a cartridge loading space.

FIG. 4C shows a state in which the data cartridge 100 disposed in the front space is not in contact with the cartridge stopper 330, thereby the cartridge sensor shaft 510 is pushed farther from the position shown in FIG. 4B. This is because no data cartridge 100 is loaded in the inner portion of the cell 300. In this embodiment, the second moving distance that is longer than the first one is also defined beforehand. Actually, the second moving distance is defined as 6.5 mm in this embodiment. The second moving distance is set shorter than the length of each data cartridge 100 in the depth direction so as to quick the operation. However, when there is only one data cartridge loaded in the cell 300, the second moving distance may also be equal to the moving distance of the data cartridge 100 held at the limit position in the cell 300. In the case shown in FIG. 4C, the controller 700 is assumed to detect that the cartridge sensor shaft 510 moves over the first preset moving distance to the position away from the reference position (128 mm) by 134.5 mm (S104—YES). Consequently, the cartridge sensor shaft 510 comes to be pushed in as long as the second moving distance (6.5 mm) (S106), thereby the controller 700 judges that the cell 300 has a space for loading another data cartridge 100 (S107).

Figure 4D:
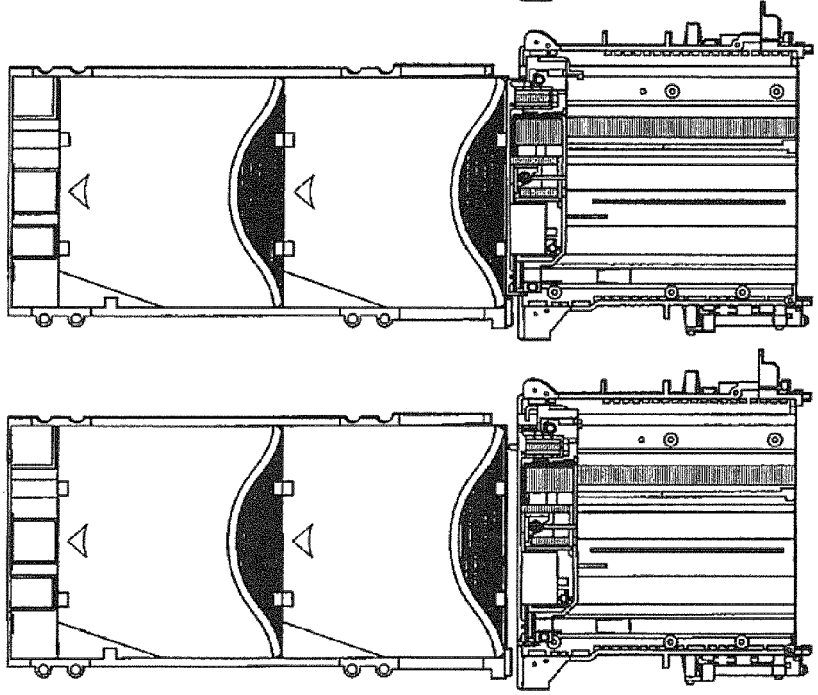
FIG. 4D is still another top view for describing how to judge presence/absence of a cartridge loading space.
Figure 5:
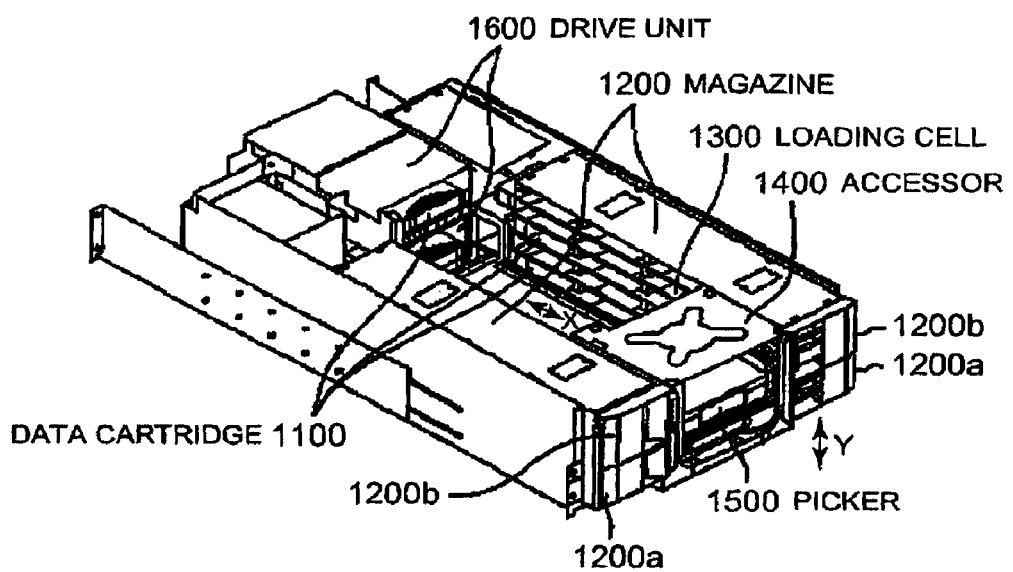
FIG. 5 is an external perspective view of a conventional library apparatus.

FIG. 4D shows a state in which the cartridge sensor shaft 510 does not come in contact with the data cartridge 100 at the reference position (128 mm) (S102—NO) and even at the position of 134.5 mm after it is pushed in by the second moving distance (6.5 mm). This state is detected by the controller 700 (S108). At this time, the controller 700, which cannot detect the existence of the data cartridge 100 loaded in the cell 300, judges that no data cartridge 100 is loaded in the cell 300, that is, there is a space for loading two data cartridges 100 in the cell (S109). In this case, the position judged as "not detected" is regarded as the position of 134.5 mm by taking consideration to the system error that might occur. The position of 134.5 mm is assumed to be away from the reference position by 6.5 mm. This moving distance from the reference position may also be changed as needed.

This means that the moving distance is the shortest when the cell loads fully, that is, two data cartridges, and the moving distance becomes longer when the cell loads only one cartridge and has a space for loading another cartridge. And when there is no cartridge loaded in the cell, the reference position for measuring the moving distance cannot be judged. The present invention uses this to judge the number of cartridges that can be loaded in the cell. In case of the library apparatus that includes many cells 100, the accessor 400 moves the picker 500 to each cell to count the total number of data cartridges 100 loaded in those cells. Thus it is possible here to know the total number of the data cartridges loaded in all the cells in the magazine 200.

This completes the description for the library apparatus that can load two data cartridges in one cell. And this library apparatus can also apply to a case in which each cell can load three or more data cartridges. In this case, the moving distance of each data cartridge disposed in the front space and pushed into the back space of the cell is stored in a table as a relationship between the number of loaded cartridges and the moving distance in the library apparatus, then the table is referred to as needed to judge the number of data cartridges to be loaded in the magazine. In this case, the data cartridge pushing device comes to be structured to enable the cartridge sensor shaft to be pushed into the inner space of the cell in accordance with the movement of the picker. However, the cartridge sensor shaft may also be provided with a device that can be extended as needed so as to push the data cartridge into the inner portion of the cell. This structure will enable the data cartridge to be pushed into the inner portion of the cell more than the moving distance as described above, thereby the present invention can apply to any loading space judging apparatus that can cope with the acquirement of the moving distances of more loaded data cartridges. And as described above, according to the present invention described in this embodiment, the library apparatus provided with a loading space judging system can judge whether or not the cell has any loading space simply and easily and the present invention described in this embodiment can also apply to even any library apparatuses that employ the deep-cell system for enabling a plurality of data cartridges to be loaded in the depth direction from the opening of each cell.

Furthermore, the picker and the cartridge sensor shaft can be united into one, thereby a dedicated driver for pushing data cartridges, which is otherwise required, can be omitted. Thus the manufacturing cost of the apparatus can be suppressed.

What is claimed is:

1. A library apparatus, comprising:
   a loading cell capable of loading at least two articles, the articles being loaded/unloaded from an opening of the loading cell;
   a biasing member that gives a biasing force to articles in a unloading direction;
   a locking device that locks the articles in the loading cell in resisting the biasing force;
   a pushing device that pushes the articles into the loading cell from the opening; and
   a controller that acquires a moving distance of the articles pushed by the pushing device, and judges that the loading cell does not have any loading space when the moving distance of the article is smaller than a first moving distance,
   wherein the controller judges that the loading cell has a loading space when the moving distance of the article is larger than the first moving distance.

2. The library apparatus according to claim 1,
wherein a magazine consist of the loading cells, and
wherein the articles are data cartridges and the pushing device is comprised in a picker used to load/unload the data cartridges.

3. The library apparatus according to claim 1, wherein the controller also judges that the loading cell has a loading space if the moving distance is equal to or larger than the first moving distance.

4. The library apparatus according to claim 1, further comprising a sensor that detects a touch of the pushing device to the article, wherein the controller judges that the loading cell has a loading space if the sensor cannot detect any touch to the article.

5. A library apparatus, comprising:
- a load means for loading cell capable of loading at least two articles;
- a bias means for giving a biasing force to articles in a unloading direction;
- a lock means for locking the articles in the loading cell in resisting the biasing force;
- a push means for pushing the articles into the loading cell from the opening;
- a acquire means for acquiring a moving distance of the articles; and
- a judge means for judging that the loading cell does not have any loading space when the moving distance of the article is smaller than a first moving distance, wherein the judge means judges that the loading cell has a loading space when the moving distance of the article is larger than the first moving distance.

* * * * *